US010059791B2

(12) United States Patent
Niessner et al.

(10) Patent No.: US 10,059,791 B2
(45) Date of Patent: *Aug. 28, 2018

(54) ABS PRODUCT WITH IMPROVED FIRE RETARDANCY

(71) Applicant: INEOS STYROLUTION GROUP GMBH, Frankfurt (DE)

(72) Inventors: Norbert Niessner, Friedelsheim (DE); SangJun Ahn, Seoul (KR); Rudy Verstraeten, Beerse (BE); Gisbert Michels, Leverkusen (DE); Florian Patcas, Ludwigshafen (DE); YoungHwa Hwang, Ulsan (KR); Brian J. Banaszak, Mannheim (DE); Roland Walker, Osnabrueck (DE); Michel Pepers, Velden (NL); Johannes Barth, Ludwigshafen (DE)

(73) Assignee: INEOS STYROLUTION GROUP GMBH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/103,669

(22) PCT Filed: Apr. 16, 2014

(86) PCT No.: PCT/EP2014/057826
§ 371 (c)(1),
(2) Date: Jun. 10, 2016

(87) PCT Pub. No.: WO2015/086164
PCT Pub. Date: Jun. 18, 2015

(65) Prior Publication Data
US 2016/0304652 A1    Oct. 20, 2016

(30) Foreign Application Priority Data

Dec. 11, 2013  (EP) .................... 13196751

(51) Int. Cl.

| *C08F 279/04* | (2006.01) |
|---|---|
| *C08J 5/00* | (2006.01) |
| *C08J 5/18* | (2006.01) |
| *C08L 25/12* | (2006.01) |
| *C08L 55/02* | (2006.01) |
| *C08L 67/00* | (2006.01) |
| *C08L 69/00* | (2006.01) |
| *C08L 77/02* | (2006.01) |
| *C08L 77/06* | (2006.01) |

(52) U.S. Cl.
CPC .............. *C08F 279/04* (2013.01); *C08J 5/00* (2013.01); *C08J 5/18* (2013.01); *C08L 25/12* (2013.01); *C08L 55/02* (2013.01); *C08L 67/00* (2013.01); *C08L 69/00* (2013.01); *C08L 69/005* (2013.01); *C08F 2500/17* (2013.01); *C08F 2800/20* (2013.01); *C08J 2325/12* (2013.01); *C08L 77/02* (2013.01); *C08L 77/06* (2013.01); *C08L 2201/02* (2013.01); *C08L 2201/10* (2013.01); *C08L 2203/30* (2013.01); *C08L 2205/025* (2013.01); *C08L 2205/035* (2013.01); *C08L 2207/04* (2013.01)

(58) Field of Classification Search
CPC .... C08F 265/00; C08F 265/04; C08F 257/02; C08F 285/00; C08L 25/12; C08L 25/14; C08L 2207/53; C08J 5/18; C08J 2325/12
See application file for complete search history.

(56) References Cited

U.S. PATENT DOCUMENTS

| 3,692,744 | A | 9/1972 | Rich et al. |
|---|---|---|---|
| 4,176,224 | A | 11/1979 | Bier et al. |
| 6,323,279 | B1 * | 11/2001 | Guntherberg ......... C08F 279/04 525/70 |
| 9,624,333 | B2 * | 4/2017 | Niessner ................ C08F 2/26 |
| 9,650,506 | B2 * | 5/2017 | Pepers ................... C08L 25/12 |
| 2012/0034478 | A1 | 2/2012 | Pepers et al. |

FOREIGN PATENT DOCUMENTS

| DE | 1900270 A1 | 11/1969 |
|---|---|---|
| DE | 2407647 A1 | 9/1974 |
| DE | 2407776 A1 | 9/1975 |
| DE | 2715932 A1 | 10/1978 |
| EP | 1752478 A1 | 2/2007 |
| EP | 1783170 A1 | 5/2007 |
| GB | 877864 A | 9/1961 |
| GB | 960368 A | 6/1964 |
| GB | 1425000 A | 2/1976 |
| WO | 2008/020012 A2 | 2/2008 |
| WO | 2012/019982 A1 | 2/2012 |
| WO | WO-2012080407 A1 * | 6/2012 |

OTHER PUBLICATIONS

English abstract of DE 2407776, retrieved from espace.net dated Sep. 21, 2016.
English abstract of WO 2008020012, retrieved from espace.net dated Sep. 21, 2016.

* cited by examiner

*Primary Examiner* — Irina S Zemel
*Assistant Examiner* — Jeffrey S Lenihan
(74) *Attorney, Agent, or Firm* — J.A. Lindeman & Co., PLLC

(57) ABSTRACT

The invention relates to thermoplastic ABS molding compositions comprising components A) and B): A) from 5 to 80% by weight of a graft polymer A) having bimodal particle size distribution; and B) from 20 to 95% by weight of a thermoplastic polymer B) having a viscosity number VN of from 50 to 120 ml/g. The invention further relates to a process for the preparation of graft copolymer A and to the graft copolymer made by that process.

10 Claims, No Drawings

ABS PRODUCT WITH IMPROVED FIRE RETARDANCY

The invention relates to thermoplastic molding compositions based on acrylonitrile-butadiene-styrene (ABS) with improved properties. The invention further relates to a process for the preparation of a graft copolymer and the graft copolymer obtainable by said process. The invention also relates to moldings and shaped articles which can be produced from thermoplastic molding compositions, and also to their use.

WO 2008/020012 discloses ABS molding compositions comprising a rubber latex of a graft copolymer A) and a SAN copolymer B). The elastomeric particulate graft base is composed of from 0 to 10 wt % styrene and of from 90 to 100 wt % butadiene and the graft is made from a SAN copolymer. The graft base is obtainable by emulsion polymerization, in particular by first feeding the entire amount of styrene, if appropriate with up to 10 wt % of butadiene, and then feeding the remaining amount of butadiene in one or more portions.

A disadvantage of said ABS molding compositions are the non-satisfying optical properties in respect to gloss and transparency. The molding compositions when colored, moreover, have poor depth of color.

It is well known that ABS type polymers are often classified "HB" in Underwriter Laboratory UL94 test, meaning that they tend to burn when ignited. Due to this burning behavior, it is required to add flame retardants, such as halogenated compounds (e.g. GB 877,864), or non-halogenated compounds, such as: phosphates, polyphosphates or polyphosphonates (GB 960,368).

However all those additives are influencing other properties, such as heat distortion temperature or Vicat, gloss, low temperature impact strength, mechanical impact strength or both.

Hence it is desirable to have a ABS type polymer with improved burning retardancy of the ABS type polymer itself. It even would be more desirable to improve all relevant mechanical properties such as melt flow rate (MVR), impact strength (monoaxial and multiaxial) and optical properties such as gloss, transparency and when colored the depth of color.

It is an object of the invention to provide ABS molding compositions having the afore-mentioned improved properties.

Subject of the invention is a thermoplastic molding composition comprising components A) to F):
A) from 5 to 80% by weight of a graft polymer A) having bimodal particle size distribution made from, based on A),
a1) from 40 to 90% by weight of an elastomeric particulate graft base a1), obtainable by polymerization of, based on a1),
a11) from 75.5 to 89.5% by weight of at least one conjugated diene,
a12) from 10.5 to 24.5% by weight of at least one vinylaromatic monomer and
a2) from 10 to 60% by weight of a graft a2) made from, based on a2),
a21) from 65 to 95% by weight of at least one vinylaromatic monomer,
a22) from 5 to 35% by weight of acrylonitrile, and
a23) from 0 to 30% by weight of at least one other monoethylenically unsaturated monomer,
B) from 20 to 95% by weight of a thermoplastic polymer B) having a viscosity number VN (determined according to DIN 53726 at 25° C., 0.5% by weight in dimethylformamide) of from 50 to 120 ml/g, made from, based on B),
b1) from 69 to 81% by weight of at least one vinylaromatic monomer,
b2) from 19 to 31% by weight of acrylonitrile, and
b3) from 0 to 30% by weight of at least one other monoethylenically unsaturated monomer and
C) from 0 to 50% by weight of a thermoplastic polymer C) having a viscosity number VN of from 50 to 120 ml/g made from, based on C),
c1) from 69 to 81% by weight of at least one vinylaromatic monomer,
c2) from 19 to 31% by weight of acrylonitrile and
c3) from 0 to 30% by weight of at least one other monoethylenically unsaturated monomer,
where components B) and C) differ in their viscosity numbers VN by at least 5 units [ml/g], or in their acrylonitrile content by at least 5 units [% by weight], or in both characteristics, viscosity number VN and acrylonitrile content, by at least 5 units and
D) from 0 to 75% by weight of a thermoplastic polymer D) made from, based on D),
d1) from 63 to less than 69% by weight of at least one vinylaromatic monomer,
d2) from more than 31 to 37% by weight of acrylonitrile,
d3) from 0 to 40% by weight of at least one other monoethylenically unsaturated monomer and
E) from 0 to 50% by weight of a thermoplastic polymer E) made from, based on E),
e1) from 4 to 96% by weight of at least one vinylaromatic monomer,
e2) from 4 to 96% by weight of at least one monomer selected from the class consisting of methyl methacrylate, maleic anhydride and maleimides and
e3) from 0 to 50% by weight of acrylonitrile,
where the polymer E) is different from the polymers B) and from C) and D) if they are present and
F) from 0 to 50% by weight of additives F, and where the entire components A) to F) give exactly 100% by weight.

Component A) is a graft copolymer having bimodal particle size distribution and is present in the novel molding compositions in a proportion of from 5 to 80% by weight, preferably from 10 to 70% by weight, particularly preferably from 15 to 60% by weight, based on the total of components A) and B) and, if present, C), D), E) and F). The graft polymer A) is built up from a "soft" elastomeric, particulate graft base a1) and a "hard" graft a2).

The graft base a1) is present in a proportion of from 40 to 90% by weight, preferably from 45 to 85% by weight, and particularly preferably from 50 to 80% by weight, based on component A).

The graft a2) is present in a proportion of from 10 to 60% by weight, preferably from 15 to 55% by weight, and particularly preferably from 20 to 50% by weight, based on component A).

Examples of conjugated dienes a11) are butadiene, isoprene, chloroprene and mixtures of these. Preference is given to the use of butadiene or isoprene or mixtures of these, and butadiene is particularly preferred.

Examples of vinylaromatic monomers a12) are styrene and styrene derivatives such as alkylated styrenes, in especially $C_1$-$C_8$-alkylstyrenes, in particular alpha-methylstyrene. Styrene, alpha-methylstyrene and mixtures of these are preferred, and styrene being particularly preferred.

The graft base a1) is obtained by polymerizing, based on a1), a11) from 75.5 to 89.5% by weight, preferably from 76 to 89% by weight, and particularly preferably from 78 to 88% by weight, and very particular preferred from 79 to 86% by weight, of at least one conjugated diene, and a12) from 10.5 to 24.5% by weight, preferably from 11 to 24% by weight, and particularly preferably from 12 to 22% by weight, and very particular preferred from 14 to 21% by weight, of at least one vinylaromatic monomer.

Preferably use is made of a graft base made from, based on a1), a11) from 75.5 to 89.5% by weight, preferably from 76 to 89% by weight, and particularly preferably from 78 to 88% by weight, and very particular preferred from 79 to 86% by weight, of butadiene, and a12) from 10.5 to 24.5% by weight, preferably from 11 to 24% by weight, and particularly preferably from 12 to 22% by weight, and very particular preferred from 14 to 21% by weight, of styrene.

A further subject of the invention is a process for the preparation of the graft polymer A) comprised in the inventive molding composition, the process comprising steps (i), (ii) and (iii):

(i) emulsion polymerization of monomers a11) and a12) to obtain a graft base a1), (ii) partial agglomeration of the graft base a1), and (iii) emulsion polymerization of graft monomers a21), a22) and optionally a23) onto the graft base obtained in step (i) or (ii), wherein in step (i) the graft base a1) is obtained by emulsion polymerization of an initial charge of from 0 to 10% by weight, preferably 3 to 10%, in particular preferred from 5 to 8% by weight of vinylaromatic monomer a12),—each based on a1)—followed by addition and statistical copolymerization of the remaining vinylaromatic monomer a12) together with the entire amount of conjugated diene a11).

A further subject of the invention is a graft copolymer A) obtainable by the inventive process and its use in the inventive molding composition.

According to a preferred embodiment of the inventive process the graft base a1) is prepared via free-radical-initiated aqueous emulsion polymerization, by using a portion of monomer a12) in an aqueous reaction medium as initial charge ("seed") and adding the remaining residual amount of monomers in the aqueous reaction medium after initiation of the free-radical polymerization reaction. In particular, component a12) is added in such a way that from 0 to 10%, preferably from 3 to 10%, in particular preferred 5 to 8% by weight, of monomer a12), based on a1), is added first as an in-situ "seed", i.e. as monomer, prior to subsequent addition of a11) and the remaining a12. In the second stage the remaining a12) (7.5 to 14.5% by weight) is added as comonomer simultaneously with a11) and the monomer mixture is statistically copolymerized. Said monomers may be added to the reaction mixture all at once, in portions in more than one step or, preferably, continuously during the polymerization.

According to a further embodiment of the inventive process, the graft base can be prepared by polymerizing the monomers a11) and a12) in the presence of a finely divided latex (the seed latex method of polymerization). This latex can be the initial charge ("seed latex") comprising substantially polystyrene. Polystyrene latex is preferred.

In the afore-mentioned preferred embodiment of the process according to the invention, the graft base a1) is prepared by a seed/feed method. In this process, the polymerization is initiated using a certain portion of the monomers a12), and the remainder of the monomers a11) and a12) (the feed portion) is added as feed during the polymerization. The feed parameters (gradient shape, amount, duration, etc.) depend on the other polymerization conditions.

In the seed/feed process, the portion of the monomers a12) in the initial charge ("seed") is from 0 to 10% by weight, preferably from 3 to 10% by weight, particular preferred 5 to 8% by weight, based on a1). The feed portion of a12) and a11) is preferably fed in within a period of from 1 to 18 hours, in particular from 2 to 16 hours, very particularly from 4 to 12 hours.

According to the inventive process (step i) and step iii)) the polymers are prepared by emulsion polymerization, usually at from 20 to 100° C., preferably from 30 to 80° C. Additional use is usually made of customary emulsifiers, for example alkali metal salts of alkyl- or alkylarylsulfonic acids, alkyl sulfates, fatty alcohol sulfonates, salts of higher fatty acids having from 10 to 30 carbon atoms, sulfosuccinates, ether sulfonates or resin soaps. It is preferable to use the alkali metal salts, in particular the Na and K salts, of alkylsulfonates or fatty acids having from 10 to 18 carbon atoms.

The emulsifiers are generally used in amounts of from 0.5 to 5% by weight, in particular from 0.5 to 3% by weight, based on the monomers used in preparing the graft base a1).

In preparing the dispersion, it is preferable to use sufficient water to give the finished dispersion a solids content of from 20 to 50% by weight. A water/monomer ratio of from 2:1 to 0.7:1 is usually used.

Suitable free-radical generators for initiating the polymerization are those which decompose at the selected reaction temperature, in especially both those which decompose by themselves and those which do so in the presence of a redox system. Examples of preferred polymerization initiators are free-radical generators such as peroxides, preferably peroxosulfates (such as sodium or potassium peroxosulfate) and azo compounds, such as azodiisobutyronitrile. It is also possible, however, to use redox systems, especially those based on hydroperoxides, such as cumene hydroperoxide.

The polymerization initiators are generally used in amounts of from 0.1 to 1% by weight, based on the graft base monomers a11) and a12).

The free-radical generators and also the emulsifiers are added to the reaction mixture, for example, batchwise as a total amount at the beginning of the reaction or in stages, divided into a number of portions, at the beginning and at one or more later times, or continuously over a defined period. Continuous addition may also follow a gradient, which may, for example, rise or fall and be linear or exponential or even a step function.

It is also possible and preferred to include in the reaction molecular weight regulators, such as ethylhexyl thioglycolate, n-dodecyl or t-dodecyl mercaptan or other mercaptans, terpinols and dimeric alpha-methylstyrene or other compounds suitable for regulating molecular weight. The use of t-dodecyl mercaptan is preferred. The molecular weight regulators may be added to the reaction mixture batchwise or continuously, as described above for the free-radical generators and emulsifiers.

To maintain a constant pH, preferably of from 6 to 9, it is possible for the reaction to include buffer substances such as $Na_2HPO_4/NaH_2PO_4$, sodium hydrogencarbonate or buffers based on citric acid/citrate. Regulators and buffer substances are used in the customary amounts, and further details on this point are therefore unnecessary.

In a particularly preferred embodiment, a reductant is added during the grafting of the graft base a1) with the monomers a21) to a23).

Graft polymers having a number of "soft" and "hard" shells, eg. of the structure a1)-a2)-a1)-a2) or a2)-a1)-a2), are also suitable, especially where the particles are of relatively large size.

The precise polymerization conditions, in particular the type, amount and method of addition of the emulsifier and of the other polymerization auxiliaries are preferably selected so that the resultant latex of the graft polymer A has a mean particle size, defined by the d50 of the particle size distribution, of from 80 to 800, preferably from 80 to 600 and particularly preferably from 85 to 400.

The reaction conditions are balanced so that the polymer particles have a bimodal particle size distribution, in especially a particle size distribution having two maxima whose distinctness may vary. The first maximum is more distinct (peak comparatively narrow) than the second and is generally at from 25 to 200 nm, preferably from 60 to 170 nm and particularly preferably from 70 to 150 nm. The second maximum is broader in comparison and is generally at from 150 to 800 nm, preferably from 180 to 700, particularly preferably from 200 to 600 nm. The second maximum here (from 150 to 800 nm) is at larger particle sizes than the first maximum (from 25 to 200 nm).

The bimodal particle size distribution is achieved by (partial) agglomeration of the polymer particles. This can be achieved, for example, by the following procedure: the monomers a1), which form the core, are polymerized in step i) to a conversion of usually at least 90%, preferably greater than 95%, based on the monomers used. This conversion is generally achieved in from 4 to 20 hours. The resultant rubber latex has a mean particle size d50 of not more than 200 nm and a narrow particle size distribution (virtually monodisperse system).

In step ii), the rubber latex is agglomerated. This is generally done by adding a dispersion of an acrylate polymer. Preference is given to the use of dispersions of copolymers of $C_1$-$C_4$-alkyl acrylates, preferably of ethyl acrylate, with from 0.1 to 10% by weight of monomers which form polar polymers, examples being acrylic acid, methacrylic acid, acrylamide, methacrylamide, N-methylol methacrylamide and N-vinylpyrrolidone. Particular preference is given to a copolymer of 96% of ethyl acrylate and 4% of methacrylamide. The agglomerating dispersion may, if desired, also contain more than one of the acrylate polymers mentioned.

In general, the concentration of the acrylate polymers in the dispersion used for agglomeration should be from 3 to 40% by weight. For the agglomeration, from 0.2 to 20 parts by weight, preferably from 1 to 5 parts by weight, of the agglomerating dispersion are used for each 100 parts of the rubber latex, the calculation in each case being based on solids. The agglomeration is carried out by adding the agglomerating dispersion to the rubber. The addition rate is usually not critical, and the addition usually takes from 1 to 30 minutes at from 20 to 90° C., preferably from 30 to 75° C.

Beside an acrylate polymer dispersion, use may also be made of other agglomerating agents, such as acetic anhydride, for agglomerating the rubber latex. Agglomeration by pressure or freezing is also possible. The methods mentioned are known to the person skilled in the art.

Under the conditions mentioned, the rubber latex is only partially agglomerated, giving a bimodal distribution. More than 50%, preferably from 75 to 95%, of the particles (distribution by number) are generally in the non-agglomerated state after the agglomeration. The resultant partially agglomerated rubber latex is relatively stable, and it is therefore easy to store and transport it without coagulation occurring.

To achieve a bimodal particle size distribution of the graft polymer A), it is also possible to prepare, separately from one another in the usual manner, two different graft polymers A') and A") differing in their mean particle size, and to mix the graft polymers A') and A") in the desired mixing ratio.

The polymerization of the graft base a1) is usually carried out with reaction conditions selected to give a graft base having a particular crosslinked nature. Examples of parameters which are important for this are the reaction temperature and duration, the ratio of monomers, regulator, free-radical initiator and, for example in the feed process, the feed rate and the amount and timing of addition of regulator and initiator.

One method for describing the crosslinked nature of crosslinked polymer particles is measurement of the swelling index QI, which is a measure of the solvent-swellability of a polymer having some degree of crosslinking. Examples of customary swelling agents are methyl ethyl ketone and toluene. The QI of the novel molding compositions is usually in the range QI=from 10 to 60, preferably from 15 to 55 and particularly preferably from 20 to 50.

Another method for describing the extent of crosslinking is the measurement of T2 times, the NMR relaxation times of protons capable of movement. The more strongly crosslinked a particular network is, the lower its T2 times are. Customary T2 times for the graft bases a1) according to the invention are in the range from 2.0 to 4.5 ms, preferably from 2.5 to 4.0 ms and particularly preferably from 2.5 to 3.8 ms, measured at 80° C., on specimens in film form.

Gel content is another criterion for describing the graft base and its extent of crosslinking, and is the proportion of material which is crosslinked and therefore insoluble in a particular solvent. It is useful to determine the gel content in the solvent also used for determining the swelling index. Gel contents of the graft bases a1) according to the invention are usually in the range from 50 to 90%, preferably from 55 to 85% and particularly preferably from 60 to 80%.

The following method may, for example, be used to determine the swelling index: about 0.2 g of the solid from a graft base dispersion converted to a film by evaporating the water is swollen in a sufficient quantity (eg. 50 g) of toluene. After, for example, 24 h, the toluene is removed with suction and the specimen is weighed. The weighing is repeated after the specimen has been dried in vacuo. The swelling index is the ratio of the specimen weight after the swelling procedure to the dry specimen weight after the second drying. The gel content is calculated correspondingly from the ratio of the dry weight after the swelling step to the weight of the specimen before the swelling step.

The T2 time is determined by measuring the NMR relaxation of a specimen of the graft base dispersion from which water has been removed and which has been converted into a film. For this, the specimen is, for example, dried in air overnight, at 60° C. for 3 h in vacuo and then studied at 80° C., using a suitable measuring apparatus, eg. Bruker minispec. It is only possible to compare specimens studied by the same method, since the relaxation is markedly temperature-dependent.

The graft a2) is obtained by polymerizing, based on a2), a21) from 65 to 95% by weight, preferably from 70 to 90% by weight, particularly preferably from 75 to 85% by weight, of at least one vinylaromatic monomer, in particular styrene, a22) from 5 to 35% by weight, preferably from 10 to 30% by weight, particularly preferably from 15 to 25% by weight of acrylonitrile, and a23) from 0 to 30% by weight, preferably from 0 to 20% by weight, particularly preferably to 0 to 15% by weight, of at least one further monoethylenically unsaturated monomer.

Examples of vinylaromatic monomers a21) are styrene and styrene derivatives such as alkylated styrenes, in especially $C_1$-$C_8$-alkylstyrenes, in particular alpha-methylstyrene, and mixtures of these. Preference is given to the use of styrene.

Examples of monoethylenically unsaturated comonomers a23) are:
methacrylonitrile, acrylonitrile; acrylic acid, methacrylic acid, and also dicarboxylic acids, such as maleic acid and fumaric acid and their anhydrides, such as maleic anhydride; nitrogen-functional monomers, such as dimethylaminoethyl acrylate, diethylaminoethyl acrylate, vinylimidazole, vinylpyrrolidone, vinylcaprolactam, vinylcarbazole, vinylaniline, acrylamide; $C_1$-$C_{10}$-alkylacrylates, such as methyl acrylate, ethyl acrylate, n-propyl acrylate, isopropyl acrylat, n-butyl acrylate, isobutyl acrylate, sec-butyl acrylate, tert-butyl acrylate, ethylhexyl acrylate, and the corresponding $C_1$-$C_{10}$-alkyl methacrylates, and hydroxyethyl acrylate; aromatic and aralipathic (meth)acrylates, such as phenyl acrylate, phenyl methacrylate, benzyl acrylate, benzyl methacrylate, 2-phenylethyl acrylate, 2-phenylethyl methacrylate, 2-phenoxyethyl acrylate and 2-phenoxyethyl methacrylate; N-substituted maleimides, such as N-methyl-, N-phenyl- and N-cyclohexylmaleimide; unsaturated ethers, such as vinyl methyl ether, and mixtures of these monomers.

Methyl methacrylate and acrylates, such as n-butyl acrylate, are in particular suitable. Methyl methacrylate (MMA) is very particularly suitable as monomer a23), an amount of up to 20% by weight of MMA, based on a2), being preferred.

The graft a2) may be prepared under the same conditions as those used for preparation of the graft base a1) and may be prepared in one or more process steps. In two-stage grafting, for example, it is possible to polymerize styrene and/or alpha-methylstyrene alone, and then styrene and acrylonitrile, in two sequential steps. This two-step grafting (firstly styrene, then styrene/acrylonitrile) is a preferred embodiment. Further details concerning the preparation of the graft polymers A) are given in DE-OS 12 60 135 and 31 49 358.

In accordance with the inventive process (step iii)) the graft polymerization onto the graft base is advantageously carried out a1) in aqueous emulsion. It may be undertaken in the same system used for polymerizing the graft base, and further emulsifier and initiator may be added. These need not be identical with the emulsifiers and/or initiators used for preparing the graft base a1). For example, it may be expedient to use a persulfate as initiator for preparing the graft base a1) but a redox initiator system for polymerizing the graft shell a2). Otherwise, that which was said for the preparation of the graft base a1) is applicable to the selection of emulsifier, initiator and polymerization auxiliaries. The monomer mixture to be grafted on may be added to the reaction mixture all at once, in portions in more than one step or, preferably, continuously during the polymerization.

If non-grafted polymers are produced from the monomers a21) and a22) during the grafting of the graft base a1), the amounts, which are generally less than 10% by weight of a2), are attributed to the weight of component A).

Component B) is a thermoplastic polymer and is present in the novel molding compositions in a proportion of from 20 to 95% by weight, preferably from 30 to 90% by weight and particularly preferably from 40 to 85% by weight, based on the total of components A) and B), and, if present, C), D), E) and F).

Component B) is obtained by polymerizing, based on B),
b1) from 69 to 81% by weight, preferably from 70 to 78% by weight and particularly preferably from 70 to 77% by weight, of at least one vinylaromatic monomer
b2) from 19 to 31% by weight, preferably from 22 to 30% by weight and particularly preferably from 23 to 30% by weight, of acrylonitrile
b3) from 0 to 30% by weight, preferably from 0 to 28% by weight, of at least one other monoethylenically unsaturated monomer.

Suitable vinylaromatic monomers b1) are styrene and styrene derivatives as described for component a12). Preference is given to the use of styrene and/or alpha-methylstyrene.

In a preferred embodiment, the graft a2) of the graft polymer A) consists essentially of, based on a2),
a21) from 75 to 85% by weight of styrene and/or alpha-methylstyrene
a22) from 15 to 25% by weight of acrylonitrile,
and the thermoplastic polymer B) consists essentially of, based on B),
b1) from 70 to 78% by weight of styrene, and
b2) from 22 to 30% by weight of acrylonitrile.

In a particular embodiment, component B) consists of two polymers B') and B"). The polymer B') here corresponds to the polymer B) described above, where the vinylaromatic monomers kW) are only non-alkylated vinylaromatics. Styrene is preferred as monomer ID1') in B').

The polymer B") corresponds to the polymer B) described above, where the vinylaromatic polymers b1") are only alkylated vinylaromatics. Alpha-methylstyrene is preferred as monomer b1") in B").

Polymer B") is preferably an alpha-methylstyrene-acrylonitrile copolymer. If component B) comprises two components B') and B"), it particularly preferably consists of a styrene-acrylonitrile copolymer B') and an alpha-methylstyrene-acrylonitrile polymer B").

If B) consists of B') and B"), the ratio B')/B") is preferably from 99:1 to 1:99, preferably from 95:5 to 5:95.

The other monomers b3) may be the monomers mentioned earlier for component a23). Particularly suitable monomers are methyl methacrylate and N-alkyl- and/or N-arylmaleimides such as N-phenylmaleimide.

The polymers B) which due to their main components styrene and acrylonitrile are generally also referred to as SAN polymers are known and in some cases also commercially available.

Component B) has a viscosity number VN (determined according to DIN 53 726 at 25° C. on a 0.5% by weight solution of component B) in dimethylformamide) of from 50 to 120 ml/g, preferably from 52 to 110 ml/g and particularly preferably from 55 to 105 ml/g. It is obtained in a known manner by bulk, solution, suspension, precipitation or emulsion polymerization, bulk and solution polymerization being preferred. Details of these processes are described, for example, in Kunststoffhandbuch, ed. R. Vieweg and G. Daumiller, Vol. V "Polystyrol", Carl-Hanser-Verlag Munich, 1969, p. 118 ff.

Component C) is likewise a thermoplastic polymer and is present in the novel molding compositions in a proportion of from 0 to 50% by weight, preferably from 0 to 40 by weight and particularly preferably from 0 to 30% by weight, based on the total of components A) and B), and, if present, C), D), E) and F). If component C) is present its minimum amount comprised is usually 0.1% by weight.

Component C) is obtained by polymerizing, based on C),
c1) from 69 to 81% by weight, preferably from 71 to 78% by weight and particularly preferably from 72 to 77% by weight, of at least one vinylaromatic monomer,
c2) from 19 to 31% by weight, preferably from 22 to 29% by weight and particularly preferably from 23 to 28% by weight, of acrylonitrile, and
c3) from 0 to 40% by weight, preferably from 0 to 30% by weight, of at least one other monoethylenically unsaturated monomer.

Suitable vinylaromatic monomers c1) are styrene and styrene derivatives as described for component a12). The use of styrene is preferred. The other monomers c3) may be the monomers mentioned earlier for components a23). Particularly suitable monomers are methyl methacrylate, maleic anhydride and N-phenylmaleimide.

Component C) has a viscosity number VN of from 50 to 120 ml/g, preferably from 52 to 110 ml/g and particularly preferably from 55 to 105 ml/g. It is obtained in a known manner by bulk, solution, suspension, precipitation or emulsion polymerization, bulk and solution polymerization being preferred. Details of these processes are given, for example, in Kunststoffhandbuch, ed. R. Vieweg and G. Daumiller, Vol. V "Polystyrol", Carl-Hanser-Verlag Munich, 1969, p. 118 ff.

Components B) and C) are thus polymers of the SAN type incorporating comparatively little acrylonitrile (not more than 31% by weight). According to the invention, the difference between B) and C) is either that the viscosity numbers VN of B) and C) differ by at least 5 units [ml/g] (in this case, the mean molar masses M of B) and C) are different from one another), or that the acrylonitrile contents of B) and C) (monomers b2) and c2), respectively) differ by at least 5 units [% by weight], or that both characteristics mentioned above, viscosity number VN and acrylonitrile content, differ by at least 5 units.

Component D) is also a thermoplastic polymer and is present in the novel molding compositions in a proportion from 0 to 50% by weight, preferably from 0 to 40% by weight and in particular from 0 to 30% by weight, based on the total of components A) and B), and C), D), E) and F) if they are present. If component D) is present its minimum amount comprised is usually 0.1% by weight.

Component D) is obtained by polymerizing, based on D),
d1) from 63 to less than 69% by weight, preferably from 64 to 68% by weight, of at least one vinylaromatic monomer,
d2) from 31 to 37% by weight, preferably from 32 to 36% by weight, of acrylonitrile,
d3) from 0 to 40% by weight, preferably from 0 to 30% by weight, of at least one other monoethylenically unsaturated monomer.

Suitable vinylaromatic monomers d1) are styrene and styrene derivatives as described for component a12). Preference is given to the use of styrene and/or alpha-methylstyrene, particularly styrene. The other monomer d3) may be the monomers mentioned earlier for component a23). Particularly suitable monomers are methyl methacrylate, maleic anhydride, N-phenylmaleimide and other N-substituted maleimides.

Thus, component D), like components B) and C), is a SAN polymer, but differs from B) and C) by a low content of vinylaromatic monomers d1) and a higher content of acrylonitrile d2) (more than 31% by weight).

Component D) generally has a viscosity number VN of from 55 to 110 ml/g, preferably from 56 to 105 ml/g and particularly preferably from 58 to 103 ml/g. Component D) is obtained in a known manner by bulk, solution, suspension, precipitation or emulsion polymerization. Details of these processes are described, for example, in Kunststoffhandbuch, ed. R. Vieweg and G. Daumiller, Vol. V "Polystyrol", Carl-Hanser-Verlag Munich 1969, p. 118 ff.

Component E) is also a thermoplastic polymer and is present in the novel molding compositions in a proportion of from 0 to 50% by weight, preferably from 0 to 40% by weight and particularly preferably from 0 to 30% by weight, based on the total of components A) and B), and C), D), E) and F) if they are present. If component E) is present its minimum amount comprised is usually 0.1% by weight.

Component E) is obtained by polymerizing, based on E),
e1) from 4 to 96% by weight, preferably from 8 to 92% by weight and particularly preferably from 10 to 90% by weight, of at least one vinylaromatic monomer,
e2) from 4 to 96% by weight, preferably from 8 to 92% by weight and particularly preferably from 10 to 90% by weight, of at least one monomer selected from the class consisting of maleic anhydride, maleimides, $C_1$-$C_{20}$-alkyl acrylates and $C_1$-$C_{20}$-alkyl methacrylates,
e3) from 0 to 50% by weight, preferably from 0 to 40% by weight and particularly preferably from 0 to 30% by weight of acrylonitrile.

Suitable vinylaromatic monomers e1) are styrene and styrene derivatives as described for a12). Preference is given to the use of styrene and/or alpha-methylstyrene. Among the $C_1$-$C_{20}$-alkyl methacrylates (one of the monomers e2)), preference is given to methyl methacrylate MMA. Particularly preferable components E) are copolymers of styrene and maleic anhydride or of styrene and maleimides, or of styrene, maleimides and MMA or of styrene, maleimides and acrylonitrile, or of styrene, maleimides, MMA and acrylonitrile.

According to the invention, the monomers e1) to e3) are selected so that the polymer E) differs from the polymers B) and, if they are also present in the molding compositions, C) and D). The polymers E) can serve to increase the heat resistance of the thermoplastic molding compositions.

Component E) generally has a viscosity number VN of from 50 to 120 ml/g, preferably from 55 to 110 ml/g. Component E) is obtained in a known manner by bulk, solution, suspension, precipitation or emulsion polymerization. Details of these processes are described, for example, in Kunststoffhandbuch, ed. R. Vieweg and G. Daumiller, Vol. V "Polystyrol", Carl-Hanser-Verlag Munich, 1969, p. 118 ff.

Component F) consists of additives which are present in the novel thermoplastic molding compositions in a proportion of from 0 to 50% by weight, preferably from 0 to 45% by weight and particularly preferably from 0 to 30% by weight, based on the total of components A) and B), and C), D), E) and F) if they are present. If component F) is present its minimum amount comprised is usually 0.1% by weight.

Component F) includes lubricants or mold-release agents, waxes, pigments, dyes, flame retardants, antioxidants, stabilizers to counter the action of light, fibrous and pulverulent fillers, fibrous and pulverulent reinforcing agents, antistats and other additives, or mixtures of these.

Examples of suitable lubricants and mold-release agents are stearic acids, stearyl alcohol, esters or amides of stearic acid, silicone oils, montan waxes and polyethylene- and polypropylene-based lubricants.

Examples of pigments are titanium dioxide, phthalocyanines, ultramarine blue, iron oxides and carbon black, and the entire class of organic pigments.

For the purposes of the invention, dyes are all dyes which can be used for the transparent, semitransparent or non-transparent coloration of polymers, in particular those which are suitable for coloration of styrene copolymers. Dyes of this type are known to the person skilled in the art.

Examples of usual flame retardants are the halogen- or phosphorus-containing compounds known to the person skilled in the art, magnesium hydroxide and other customary compounds or mixtures of these. Red phosphorus is also suitable. Preferably the inventive composition does not contain any additional flame retardants.

Particularly suitable antioxidants are sterically hindered mono- or polynuclear phenolic antioxidants, which may be substituted in various ways and also bridged via substituents. These include not only monomeric but also oligomeric compounds, which may be built up from more than one fundamental phenol unit. Hydroquinones and substituted compounds which are hydroquinone analogs are also suitable, as are antioxidants based on tocopherols and their derivatives. Mixtures of different antioxidants may also be used. In principle, it is possible to use any compound which is commercially available or suitable for styrene copolymers, such as Topanol® or Irganox®.

Alongside the phenolic antioxidants mentioned as examples above, it is possible to use costabilizers, in particular phosphorus- or sulfur-containing costabilizers. Such phosphorus- or sulfur-containing costablizers are known to the person skilled in the art and are commercially available.

Examples of suitable stabilizers to counter the action of light are various substituted resorcinols, salicylates, benzotriazoles, benzophenones and HALS (hindered amine light stabilizers), commercially available, for example, as Tinuvin®.

Examples of fibrous and/or particulate fillers are carbon fibers or glass fibers in the form of glass fabrics, glass mats or glass fiber rovings, chopped glass or glass beads, and wollastonite, particularly preferably glass fibers. If glass fibers are used, these may be provided with a size and a coupling agent for better compatibility with the blend components. The glass fibers may be incorporated either in the form of short glass fibers or in the form of continuous strands (rovings).

Suitable particulate fillers are carbon black, amorphous silicic acid, magnesium carbonate (chalk) [sic], powdered quartz, mica, mica [sic], bentonites, talc, feldspar or in particular calcium silicates, such as wollastonite, and kaolin.

Examples of suitable antistats are amine derivatives, such as N,N-bis(hydroxyalkyl)alkylamines or -alkyleneamines, polyethylene glycol esters, copolymers of ethylene glycol and propylene glycol, and glycerol mono- and distearates, and mixtures of these.

The individual additives are used in the usual amounts in each case, and further details on this point are therefore unnecessary.

The composition according to the invention can further comprise a component G) which is at least one polymer selected from the group of the polycarbonates, polyesters, polyester carbonates, and polyamides. Preferred polymers G) are polycarbonates and polyamides, in particular polycarbonate.

The suitable polycarbonates and, respectively, polyester carbonates can be linear or branched. Branched products are preferably obtained via incorporation of from 0.05 to 2.0 mol %, based on the entirety of the diphenols used, of compounds whose functionality is three or more, e.g. those having three or more phenolic OH groups. The polycarbonates and polyester carbonates can comprise halogen bonded to an aromatic system, preferably bromine and/or chlorine. However, they are preferably halogen-free. Their average molecular weights ($M_w$, weight-average; determined, for example, via ultracentrifuging or scattered light measurement) are from 10 000 to 200 000, preferably from 20 000 to 80 000.

Suitable thermoplastic polyesters are preferably polyalkylene terephthalates, i.e. reaction products composed of aromatic dicarboxylic acids or of their reactive derivatives (e.g. dimethyl esters or anhydrides) and of aliphatic, cycloaliphatic, or arylaliphatic diols, and mixtures of these reaction products. Preferred polyalkylene terephthalates can be prepared from terephthalic acids (or from their reactive derivatives) and from aliphatic or cycloaliphatic diols having from 2 to 10 carbon atoms, by known methods (see Kunststoff-Handbuch [Plastics Handbook], volume VIII. pp. 695 et seq., Carl Hanser Verlag, Munich 1973). In preferred polyalkylene terephthalates, from 80 to 100 mol %, preferably from 90 to 100 mol %, of the dicarboxylic acid radicals are terephthalic acid radicals, and from 80 to 100, preferably from 90 to 100 mol %, of the diol radicals are ethylene glycol radicals and/or 1,4-butanediol radicals. The polyalkylene terephthalates can comprise (see, for example, DE 2 407 647, DE 2 407 776, and also DE 2715 932) from 0 to 20 mol % of radicals of other aliphatic diols having from 3 to 12 carbon atoms or of cycloaliphatic diols having from 6 to 12 carbon atoms, alongside ethylene glycol radicals and, respectively, 1,4-butanediol radicals. The polyalkylene terephthalates can be branched via incorporation of relatively small amounts of tri- or tetrahydric alcohols or of tri- or tetrabasic carboxylic acids, these being as described in DE 1 900 270 and U.S. Pat. No. 3,692,744.

Particularly preferred branching agents are trimesic acid trimellitic acid, trimethylolethane, trimethylolpropane, and pentaerythritol. It is advisable to use no more than 1 mol % of the branching agent, based on the acid component. Preference is given to polyalkylene terephthalates which have been prepared solely from terephthalic acid and from its reactive derivatives (e.g. its dialkyl esters) and from ethylene glycol and/or 1,4-butanediol, and to mixtures of these polyalkylene terephthalates. Other preferred polyalkylene terephthalates are copolyesters which have been prepared from at least two of the abovementioned alcohol components: particularly preferred copolyesters are poly (ethylene glycol 1,4-butanediol) terephthalates.

Suitable polyamides are known homopolyamides, copolyamides, and mixtures of these polyamides. These can be semicrystalline and/or amorphous polyamides.

Semicrystalline polyamides that can be used are nylon-6, nylon-6,6, and mixtures, and corresponding copolymers composed of these components. It is also possible to use semicrystalline polyamides whose acid component is composed entirely or to some extent of terephthalic acid and/or isophthalic acid and/or suberic acid and/or sebacic acid and/or azelaic acid and/or adipic acid and/or cyclohexanedicarboxylic acid, and whose diamine component is composed entirely or to some extent of m- and/or p-xylylenediamine and/or hexamethylenediamine and/or 2,2,4-trimethylhexamethylenediamine and/or 2,2.4-trimethylhexamethylenediamine and/or isophoronediamine, and whose constitution is known. Mention may also be made of polyamides which are prepared entirely or to some extent from lactams having from 7 to 12 carbon atoms in the ring, if appropriate with concomitant use of one or more of the abovementioned starting components.

Amorphous polyamides that can be used are known products which are obtained via polycondensation of diamines, such as ethylenediamine, hexamethylenediamine, decamethylenediamine, 2,2,4- and/or 2,4,4-trimethylhexamethylenediamine, m- and/or p-xylylenediamine, bis(4-aminocyclohexyl)methane, bis(4-aminocyclohexyl)propane, 3,3'-dimethyl-4,4'-diaminodicyclohexylmethane, 3-aminomethyl,3,5,5-trimethylcyclohexylamine, 2,5- and/or 2,6-bis(aminomethyl)norbornane, and/or 1,4-diaminomethylcyclohexane, with dicarboxylic acids, such as oxalic acid, adipic acid, azelaic acid, decanedicarboxylic acid, heptadecanedicarboxylic acid, 2,2,4- and/or 2,4,4-trimethyladipic acid, isophthalic acid, and terephthalic acid.

Other suitable copolymers are those obtained via polycondensation of a plurality of monomers, and also copolymers prepared using addition of aminocarboxylic acids, such as ε-aminocaproic acid, ω-aminoundecanoic acid, or ω-aminolauric acid, or lactams thereof. Particularly suitable amorphous polyamides are the polyamides prepared from isophthalic acid, and from hexamethylenediamine and from further diamines, such as 4,4'-diaminodicyclohexylmethane, isophoronediamine, 2,2,4- and/or 2,4,4-trimethylhexamethylenediamine, 2,5- and/or 2,6-bis(aminomethyl)norbornene; or from isophthalic acid, 4,4'-diaminodicyclohexylmethane, and ε-caprolactam; or from isophthalic acid, 3,3'-dimethyl-4,4'-diaminodicyclohexylmethane and laurolactam; or from terephthalic acid and from the isomer mixture composed of 2,2,4- and/or 2,4,4-trimethylhexamethylenediamine.

If use is also made of at least one polymer G) selected from the group of the polycarbonates, polyesters, polyester carbonates, and polyamides, in the inventive molding composition the amount of polymer G) is from 0 to 75% by weight, preferably from 0 to 70% by weight, based on the total weight of the molding composition, where the entire components A) to G) give exactly 100% by weight.

If component G) is present its minimum amount comprised is usually 0.1% by weight.

Preferred molding compositions according to the invention comprise or consist of components A), B) and if present C) to F) in the following amounts, based on the total weight of the molding composition:

A) 10 to 70% by weight;
B) 30 to 90% by weight;
C) 0 to 40% by weight
D) 0 to 40% by weight
E) 0 to 40% by weight
F) 0 to 45% by weight where the entire components A) to F) give exactly 100% by weight.

In particular preferred molding compositions according to the invention comprise or consist of components A), B) and if present C) to F) in the following amounts, based on the total weight of the molding composition:

A) 15 to 60% by weight;
B) 40 to 85% by weight;
C) 0 to 40% by weight
D) 0 to 30% by weight
E) 0 to 30% by weight
F) 0 to 30% by weight where the entire components A) to F) give exactly 100% by weight.

Very particular preferred are molding compositions according to the invention comprising or consisting of components A), B) and if present F).

Furthermore preferred are molding compositions according to the invention comprising or consisting of components A), B) and, if appropriate, F) and/or G).

Details concerning the preparation of the thermoplastic molding compositions are as follows:

The graft polymers having bimodal particle size distribution are prepared in accordance to the inventive process by emulsion polymerization and (partial) agglomeration of the polymer particles as described above for component A).

The resultant dispersion of the graft polymer A) may either be mixed directly with the components B) to F) and, if appropriate G), or worked up prior to this. The latter procedure is preferred.

The dispersion of the graft polymer A) is worked up in a manner known per se. The graft polymer A) is usually firstly precipitated from the dispersion, for example by adding acids (such as acetic acid, hydrochloric acid or sulfuric acid) or salt solutions (such as calcium chloride, magnesium sulfate or alum) which can bring about precipitation, or else by freezing (freeze coagulation). The aqueous phase may be removed in a usual manner, for example screening, filtering, decanting or centrifuging. This preliminary removal of the dispersion water gives graft polymers A) which are moist with water and have a residual water content of up to 60% by weight, based on A), where the residual water may, for example, either adhere externally to the graft polymer or else be enclosed within it.

After this, the graft polymer may, if required, be dried in a known manner, for example by hot air or using a pneumatic dryer. It is likewise possible to work up the dispersion by spray drying.

According to the invention, the graft polymers A) are mixed in a mixing apparatus with the polymer B) and the other components C), D), E), F) and/or G), if they are present, giving an essentially molten polymer mixture.

"Essentially molten" means that the polymer mixture may contain, besides the predominant molten (softened) fraction, a certain proportion of solid constituents, for example unmelted fillers and reinforcing materials, such as glass fibers, metal flakes or even unmelted pigments, dyes, etc. "Molten" means that the polymer mixture flows at least to some extent, ie. that it is softened at least to the extent of having plastic properties.

The mixing apparatuses used are those known to the person skilled in the art. Components A) and B) and C), D), E), F) and G) if they are present may be mixed, for example, by extruding, kneading or rolling them together, components A) to G) having been previously isolated if necessary from the solution resulting from the polymerization or from the aqueous dispersion.

If one or more components are incorporated in the form of an aqueous dispersion or of an aqueous or non-aqueous solution, the water or the solvent is removed from the mixing apparatus, preferably an extruder, via a devolatilizing unit.

Examples of mixing apparatuses for the novel process are discontinuously operating heated internal mixers with or without rams, continuously operating kneaders, such as continuous internal mixers, screw compounders having axially oscillating screws, Banbury mixers, and also extruders, roll mills, mixing rolls where the rolls are heated and calenders.

Preference is given to using an extruder as mixing apparatus. Single- or twin-screw extruders, for example, are particularly suitable for extruding the melt. A twin-screw extruder is preferred.

In many cases, the mechanical energy introduced by the mixing apparatus during the mixing process is sufficient to bring about melting of the mixture, and therefore it is not necessary to heat the mixing apparatus. Otherwise, the mixing apparatus is generally heated. The temperature depends on the chemical and physical properties of components A) and B), and C), D), E), F) and G) if they are present, and should be selected so that an essentially molten polymer mixture is produced. To avoid thermal degradation of the polymer mixture, on the other hand, the temperature should not be excessive. The mechanical energy introduced may, however, even be sufficient to require actual cooling of the mixing apparatus. The mixing apparatus is usually operated at from 150 to 300° C., preferably from 180 to 300° C.

In a preferred embodiment, the graft polymer A) is mixed with the polymer B) and the other components C), D), E), F) and/or G), if they are present, in an extruder, the dispersion of the graft polymer A) being metered into the extruder without prior removal of the dispersion water. The water is usually removed over the length of the extruder via suitable venting systems. Examples of venting systems are vents provided with retaining screws (which prevent the emergence of the polymer mixture).

In another embodiment which is also preferred, the graft polymer A) is mixed with the polymer B) and the other components C), D), E), F) and/or G), if they are present, in an extruder, the graft polymer A) having previously been separated from the dispersion water. This prior removal of the dispersion water gives graft polymers A) which are moistened with water and have a residual water content of up to 60% by weight, based on A), where the residual water may, for example, either adhere externally to the graft polymer or else be enclosed therein. The residual water which is present may then, as described above, be removed as steam via venting systems in the extruder.

In a particularly preferred embodiment, however, the residual water in the extruder is not solely removed as steam; instead, some of the residual water is removed mechanically in the extruder and leaves the extruder in the liquid phase. This process will now be described below in more detail:

For this process, the graft polymer is separated beforehand from the dispersion water, for example by screening, pressing, filtering, decanting, sedimenting or centrifuging, or by drying involving heat to some extent. The graft polymer from which water has been partially removed in this manner and which contains up to 60% by weight of residual water is then metered into the extruder.

The material metered in is conveyed by the screw against a retarding element which acts as an obstacle and is generally located at the end of a "squeeze section". This restricted flow zone builds up a pressure which presses ("squeezes") the water out of the graft polymer. Different pressures may be built up, depending on the rheological behavior of the rubber, by varying the arrangement of screw elements, kneading elements or other retarding elements. In principle, any commercially available element which serves to build up pressure in the apparatus is suitable.

Examples of possible retarding elements are pushed-over, conveying screw elements, screw elements having a pitch opposite to the conveying direction, including screw elements having conveying threads of large pitch (pitch larger than the diameter of the screw) opposite to the conveying direction (termed LGS elements), kneading blocks having non-conveying kneading disks of different width, kneading blocks having a back-conveying pitch, kneading blocks having a conveying pitch, barrel disks, eccentric disks and blocks configured therefrom, neutral retarding disks (baffles), mechanically adjustable restrictors (sliding barrel, radial restrictors, central restrictors).

Two or more of the retarding elements may be combined with one another. The retarding effect of the restricted flow zone can also be adapted to the respective graft rubber by adjusting the length and the intensity of the individual retarding elements.

In the squeeze section described, the screw elements located before the restricted flow zone (before the first retarding element) are generally constructed as conventional conveying screws. In a preferred embodiment, use is made of conveying screws whose pitch increases toward the restricted flow zone, in especially becomes steeper. This design brings about a relatively slow pressure build-up and is termed a transition section, which can be advantageous for the removal of water from certain rubbers.

In another preferred embodiment, the pressure is built up without a prior transition section, that is to say immediately before and/or in the restricted flow zone (in especially the conveying screw has constant pitch in the squeeze section).

In the squeeze section, it is preferable if all of the design parameters and operating parameters of the extruder are balanced so that, although the elastomer material is conveyed and compressed at the selected rotation rate of the screw, it is not, or is only to a subordinate extent, plasticized or partly melted, and is not completely melted.

The squeeze section of the extruder preferably contains, to build up pressure, screw elements having a pitch opposite to the conveying direction and/or appropriate kneading blocks.

The water pressed out of the graft polymer in the squeeze section leaves the extruder in the liquid phase and not as steam. In a less preferred embodiment, up to 20% by weight of the water removed in this section emerges as steam.

The squeeze section is provided with one or more water-removal orifices, which are normally under atmospheric pressure. "Under atmospheric pressure" means that the water emerges from the water-removal orifices under atmospheric pressure. The water-removal orifices are preferably located on the upper side of the extruder, but arrangements which are lateral or face downward are also possible. The water-removal orifices are moreover preferably provided with an apparatus which prevents discharge of the graft polymer A) which is being conveyed. Retaining screws are particularly preferred for this purpose.

The water-removal orifices are designed in a manner known per se. It is preferable to use water-removal orifices whose dimensions are selected so that they cannot be blocked by the contents of the extruder. Cut-outs or holes in the extruder barrel are particularly preferably used as water-removal orifices.

In a particularly preferred embodiment, the water-removal orifices are not Seiher housings or similar rapidly blocking components, such as screens. As previously described, Seiher housings are in fact susceptible to blocking.

The water-removal orifice associated with the retarding elements is located at a distance of at least one screw diameter $D_{screw}$, preferably at from 1 to 4 $D_{screw}$, and very particularly preferably from 1 to 2 $D_{screw}$, upstream of the retarding element or, in the case of more than one retarding element, upstream of the first retarding element. For the purposes of the invention, distance is the path length from the middle of the water-removal orifice to the beginning of the first retarding element.

This distance between retarding elements and water-removal orifice ensures that the water-removal orifice is not situated in the area of the extruder in which the pressure of the polymer conveyed against the retarding elements is very high (pressure maximum). The sealing of the orifices to prevent polymer discharge therefore generally requires only technically simple apparatuses, such as retaining screws.

The temperature of the water discharged is generally from 20 to 95° C. and preferably from 25 to 70° C., measured at the discharge orifice. In the first squeeze section, depending on the elastomer component and the residual water initially present, from 10 to 90% by weight, preferably from 20 to 80% by weight, of the residual water initially present is usually removed.

In a preferred embodiment, the extruder is not heated in the feed sections and the squeeze sections. In one embodiment, the extruder is cooled in these particular sections.

The partially dewatered graft polymer A) is conveyed through the restricted flow zones and passes to the next extruder section.

In an embodiment which is preferred for preparing some impact-modified thermoplastics, a second squeeze section follows the first squeeze section just described, and again consists of a conveying section and a restricted flow zone which acts as an obstruction. The same details for the first squeeze section essentially apply to the second squeeze section, particularly concerning the distance of the water-removal orifice from the downstream restricted flow zone.

The water which is pressed out generally leaves the extruder through all of the water-removal orifices which are present. Depending on the properties of the elastomer component and its residual water content, it is also possible, however, that the water which has been squeezed out is discharged from only one or a few of the available water-removal orifices, and the other water-removal orifices are "dry", in especially bring out no or virtually no water. This has not proven at all disadvantageous.

The mechanically by being pressed out (squeezed out) can be removed mechanically by being pressed out (squeezed out) can be removed as steam in a usual manner via venting systems in the extruder.

It is preferable if at least 30% by weight of the residual water (which, for example, may adhere externally to the graft polymer A) and/or be enclosed therein) is pressed out in the extruder in the form of liquid water. From 30 to 90% by weight of the residual water is generally removed in liquid form by squeezing, and from 10 to 70% by weight as steam via venting systems.

If an extruder is used as mixing apparatus for components A) and B), and, if present, C), D), E), F) and G), the different sections of the extruder may, as is generally known, be individually heated or cooled, so as to set an ideal temperature profile along the screw axis. The person skilled in the art is also familiar with the fact that the individual sections of the extruder can generally have different lengths.

The temperatures and lengths to be chosen for the individual sections in a particular case differ depending on the chemical and physical properties of components A) and B), and, if present, C), D), E), F) and G) as well as their mixing ratios. This applies also to the screw rotation rate, which can vary within a wide range. Rotation rates of the extruder screws in the range from 100 to 350 per minute (rpm) may be mentioned merely as examples.

According to the invention, the essentially molten polymer mixture prepared in the mixing apparatus from components A) and B), and, if present, C), D), E), F) and G) is subjected to rapid cooling.

The rapid cooling is usually carried out by bringing the essentially molten polymer mixture (given the abbreviated term "polymer melt" below) into contact with a cold medium or surface.

"Cold" here is taken to imply a temperature which is sufficiently far below that of the polymer melt for the polymer melt to cool rapidly when contact is made. "Cold" therefore does not always mean cooled. For example, a polymer melt at 200° C. may be subjected to rapid cooling by water which has previously been heated to, for example, from 30 to 90° C. The decisive factor is that the difference between the polymer melt temperature and the temperature of the cold medium or surface suffices for rapid cooling of the melt.

The polymer melt is preferably cooled rapidly using a cold medium. Media of this type may be gases or liquids.

Examples of cold gaseous media (termed cooling gases below) are cooled or uncooled air or, particularly for polymer melts which are easily oxidized, gases such as carbon dioxide, nitrogen or noble gases. Air or nitrogen is preferably used as cooling gas. The cooling gas is generally blown onto the polymer melt discharging from the mixing apparatus.

Cold liquid media (termed "cooling liquids" below) may be organic or inorganic cooling liquids. Examples of suitable organic cooling liquids are oils and other high-boiling liquid organic materials which do not interact chemically or physically (eg. swelling, solvent attack, etc.) with the polymer melt to be cooled, in especially are chemically and physically inert to the polymer melt.

Preference is given to the use of inorganic cooling liquids, in particular aqueous solutions and water. Particular preference is given to water, which may be used cooled (freezing point to room temperature), uncooled or heated (room temperature to boiling point).

The cooling liquid is generally sprayed onto the discharging polymer melt; or the polymer melt discharges from the mixing apparatus directly into a bath of the cooling liquid. It is also possible to apply the cooling liquid to the discharging polymer melt in the form of a wide jet of liquid (flood).

Spraying the polymer melt with cooling liquid is particularly advantageous when the mixing apparatus used is one which produces sheeting (for example roll mills, mixing rolls and calenders). The polymer melt being discharged in the form of a film solidifies on being sprayed with cooling liquid, to give sheeting.

The polymer melt is particularly preferably discharged directly from the mixing apparatus into a bath of the cooling liquid, very particularly preferably into a waterbath.

It is also possible, and in some cases preferable, for the polymer melt being discharged from the mixing apparatus to be firstly only slightly cooled by bringing it into contact with a cooling gas, for example by blowing onto it heated air or nitrogen gas. This solidifies only the outer surface of the melt, but the interior of the polymer remains molten. The actual rapid cooling is then carried out by bringing the melt, previously solidified at the surface, into contact with a cooling liquid, for example water, whereupon the interior of the melt also sets hard.

The extrudates of the polymer melt being discharged from the die head of the extruder may, for example, initially be solidified superficially by blowing air onto them and then carried over into a waterbath, where the actual rapid cooling takes place.

The polymer melt which has been hardened by the rapid cooling may be further processed in a manner known to the person skilled in the art. The solidified polymer is generally comminuted by grinding, chopping, granulating or other processes.

In a particularly preferred embodiment, the rapid cooling and the comminution are undertaken by the underwater granulation process. In underwater granulation, the polymer melt is discharged from the mixing apparatus via a die plate in which the holes (nozzles) are preferably round and arranged in the shape of a circle. The die plate is located underwater or is sprayed with water, and this may be done under an inert gas. Immediately behind the die plate on its outer side there are cutting apparatus, preferably rotating knives, which separate the polymer as it is discharged. The polymer is therefore separated by rotating knives and rapidly cooled in water, generally solidifying to give bead-like, to some extent round, grains.

Arrangements of the holes having other than circular shape and shapes of the holes which are other than round are, however, commonly found in the die plate.

In another embodiment, a process termed underwater extrudate granulation is used. For this, the melt is discharged as extrudate from a die plate and is immediately wetted and rapidly cooled by a stream of water and is then introduced, via a sloping plane, into a waterbath, and is granulated after cooling.

In a very particularly preferred embodiment, an extruder is used as mixing apparatus for components A) and B), and, if present, C), D), E) and F), with the underwater granulation just described. The discharge orifice of the extruder in this embodiment is therefore a die plate located underwater (or sprayed with water) and having cutting apparatus, in particular rotating knives.

Preference is therefore given to thermoplastic molding compositions comprising the components A) and B) described above and, if present, C), D), E), F) and G), obtainable by 1) preparing the graft polymers A) by emulsion polymerization as described above to give a polymer A) which is moist with water and contains up to 60% by weight, based on A), of residual water, 2) mixing the graft polymer A), which is moist with water, with the other components B) to F) in an extruder to give an essentially molten polymer mixture and pressing out at least 30% by weight of the residual water of the moist graft polymer A) as liquid water, by build-up of pressure in the extruder, 3) rapid cooling of the essentially molten polymer mixture by the underwater granulation process.

The novel thermoplastic molding compositions may be processed by the known methods of thermoplastic processing, for example by extrusion, injection molding, calendering, blowmolding, compression molding or sintering.

The invention also provides the use of the molding compostions described for the production of moldings, such as sheets or semifinished products, foils, fibers, or foams, and also the corresponding moldings, such as sheets or semifinished products, foils, fibers, or foams.

It has surprisingly been found that the novel molding compositions have a good burning retardancy even without addition of usual flame retardants. Moreover they have good mechanical properties, in particular good toughness and also good low-temperature toughness and a balanced relationship of toughness and stiffness. Their rubber-glass transition is improved. The compositions have little intrinsic color (Yellowness Index YI<25) and only a low yellowing tendency, and show only little yellowing, even after prolonged heat aging or as a result of hot processing. The molding compositions when colored, moreover, have good depth of color (low light scattering, with scattering values <4.9).

EXAMPLES

Measurements

Swelling index of the graft base: a film was prepared from the aqueous dispersion of the graft base, by evaporating the water. 0.2 g of this film was mixed with 50 g of toluene, and after 24 hours the toluene was removed with suction from the swollen specimen, and the specimen was weighed. The weighing was repeated after the specimen had been dried for 16 hours in vacuo at 110 DEG C.

Particle Sizes of the Rubber Latex

The mean particle size d given is the weight-average particle size, as determined with an analytic ultracentrifuge by the method of W. Scholtan and H. Lange, Kolloid-Z. and Z.-Polymere 250 (1972) pp. 782-796. The ultracentrifuge measurement gives the integral mass distribution of the particle diameter of a specimen. From this it is possible to deduce what percentage by weight of the particles has a diameter which is the same as or less than a particular size.

The d10 is that particle diameter for which the diameter of 10% by weight of all particles is smaller and that of 90% by weight is larger. The reverse applies to the d90:90% by weight of all particles have a smaller diameter, and 10% by weight a larger diameter, than d90. The weight-average particle diameter d50 and the volume-average particle diameter D50 are the particle diameters for which the particle diameter of, respectively, 50% by weight and 50% by volume of all particles is larger and that of, respectively, 50% by weight and 50% by volume is smaller. d10-, d50- and d90 describe the breadth Q of the particle size distribution, where Q=(d90–d10)/d50. The smaller is Q, the narrower is the distribution.

Yellowness Index YI: The Yellowness-Index YI was determined by determining the color coordinates X, Y, Z according to DIN 5033 using standard illuminant D 65 and a 10 DEG standard observer, and the following defining equation:

$$YI=(131.48X-116.46Z)/Y$$

Viscosity number VN: determined according to DIN 53726 on a 0.5% by weight solution of the polymer in dimethylformamide.

Melt index MVR: determined according to ISOI 1133 at 220° C. melt temperature and 10 kg load.

To determine the mechanical and gloss values below, the following test specimens were injection molded from the granules: standard small specimens (see DIN 53453), dumbbell specimens, disks of 60 mm diameter and 2 mm thickness and rectangular specimens of 2 mm thickness. In each case, unless otherwise stated, the melt temperature was 250° C. and the mold temperature 60° C.

Gloss: determined according to ISO 2813 on rectangular specimens of 40×60 mm with an angle of incidence of 45°, using equipment from BYK Mikroglas.

aK: the Charpy notched impact strength aK was determined on standard small specimens by a flexural impact test according to ISO 179-2/1eA (S) at 23° C. and −30° C.

Vicat: the Vicat softening point was determined on small pressed sheets according to ISO 306/B using a load of 50 N and a heating rate of 50 K/h.

IPT: the penetration energy was determined according to ISO 6603-2 on disks or rectangular specimens measuring 40×40 mm by the Plastechon test at 23° C., the samples being produced at melt temperatures of 250° C.

Tensile strength, ultimate tensile strength, elongation at break and modulus of elasticity: these values were determined according to ASTM 638 on dumb-bell specimens at 23° C.

Flame retardancy: UL 94 was measured according to Underwriters Laboratories horizontal burning test (1.2 mm thickness).

1. Preparation of Graft Polymer A)
1.1 Preparation of the Graft Base a1)
1.2 General Description of a Preparation Process:

The rubber latex (a1) can generally be prepared via the following steps, starting from 10.5 to 24.5% by weight of styrene (a12) and from 75.5 to 89.5% by weight of butadiene (a11):

a) initial charge of water, from 0.1 to 0.6% by weight, based on (a1), of potassium peroxodisulfate (pps) as initiator, and of bicarbonate buffer and from 0.1 to 1.0% by weight, based on (a1), of potassium stearate as soap;

b (in situ) seed/feed of 0 to 10% by weight of the entire amount of styrene, within a period of from 10 to 30 minutes; and then c) feed of the entire amount of butadiene and the remaining amount of styrene within a period of at least 6 hours, where the feed rate can be uniform or can be varied.

The aqueous emulsion is polymerized at about 67° C., and the temperature here can be raised up to 80° C. The reaction proceeds up to monomer conversion of as least 90%. By way of example, tert-dodecyl mercaptan (TDM) is used as molecular weight regulator and is preferably added in from three to five portions in a total amount of preferably from 0.5 to 2% by weight, based on (a1).

Table 1 shows the preparation of basic rubber dispersions in accordance with the examples and comparative examples.

Example 1

(7% by weight of styrene as seed, based on total (a1), and 93% feed, based on total (a1), of a mixture of 4% by weight of styrene and 89% by weight of butadiene)

66.14 liters of demineralized water, 339 g of potassium stearate, 177.0 g of sodium bicarbonate and 124.5 g of potassium persulfate were initially taken in a 160 l autoclave and heated to 67° C. Within 15 minutes 3.7 kg styrene is added as seed, followed by a feed of a mixture of 2 kg styrene and 46.5 kg butadiene over a period of 8 hours. 20 minutes, 4 hours and 8 hours after of the beginning of this feed, in each case 174.2 g of tert-dodecyl mercaptan were added. After the end of the main feed, postpolymerization was carried out until the conversion reached 90%. Thereafter, the pressure was let down, cooling to 50° C. was effected and the remaining butadiene was removed under reduced pressure. The dispersion was then discharged into a drum.

Example 2

(7% by weight of styrene in the seed, based on total (a1), and 93% by weight feed, based on total (a1), of a mixture of 14% by weight of styrene and 79% by weight of butadiene)
66.14 liters of demineralized water, 339 g of potassium stearate, 177.0 g of sodium bicarbonate and 124.5 g of potassium persulfate were initially taken in a 160 l autoclave and heated to 67° C.

Within 15 minutes 3.7 kg styrene is added as seed, followed by a feed of a mixture of 7.3 kg styrene and 41.2 kg butadiene over a period of 8 hours.

20 minutes, 4 hours and 8 hours after of the beginning of this feed, in each case 174.2 g of tert-dodecyl mercaptan (TDM) were added.

After the end of this feed, postpolymerization was carried out until the conversion reached 90%. Thereafter, the pressure was let down, cooling to 50° C. was effected and the remaining butadiene was removed under reduced pressure. The dispersion was then discharged into a drum.

Comparative Example 1

No Styrene Monomer in the Seed 66.14 liters of demineralized water, 339 g of potassium stearate, 177.0 g of sodium bicarbonate and 124.5 g of potassium persulfate were initially taken in a 160 l autoclave and heated to 67° C.

10 kg of butadiene were then added in the course of 30 minutes. 20 minutes after the beginning of this feed, 174.2 g of tert-dodecyl mercaptan were added. After the end of the first butadiene feed (initially taken monomer), prepolymerization was effected for 30 minutes. 39.24 kg of butadiene were then added in the course of 8 hours. 4 hours after the beginning of this main feed, 174.2 g of dodecyl mercaptan were added. 8 hours after the beginning of this main feed, a further 174.2 g of dodecyl mercaptan were added. After the end of the main feed, postpolymerization was carried out until the conversion reached 90%. Thereafter, the pressure was let down, cooling to 50° C. was effected and the remaining butadiene was removed under reduced pressure. The dispersion was then discharged into a drum.

Comparative Example 2

7% by Weight of Styrene in the Seed

The monomers are reacted in an emulsion polymerization reaction in a 150 l reactor at a constant reaction temperature of 67° C. To this end, 43.12 kg of a monomer mixture comprising 93% by weight of butadiene and 7% by weight of styrene are reacted in the presence of 1% by weight of tert-dodecyl mercaptan (TDM) and 311 g of the potassium salt of a $C_{20}$ fatty acid, 82 g of potassium persulfate, 147 g of sodium hydrogencarbonate, and 58.4 kg of water.

Styrene is first fed into the system here within a period of 20 minutes. After addition of the styrene, a first amount of butadiene is added within a period of 25 minutes, this amount of butadiene corresponding precisely to 10% of the entire amount of monomer. The remaining proportion of the butadiene is then added within a period of 8.5 hours. 20 minutes, 4 hours and 8 hours after the beginning of the BD feed TDM is added in 3 equal portions. The post-polymerization time amounts to 4 hours.

TABLE 1 preparation of basic rubber dispersions

|  | Comparative Example 1 | Comparative Example 2 | Example 1 | Example 2 |
|---|---|---|---|---|
| SM in graft base | 0 | 7 | 11 | 21 |
| % SM as "seed" | 0 | 7 | 7 | 7 |
| % SM in feed with BD | 0 | 0 | 4 | 14 |
| % coagulate | 1 | 1 | 1 | 3 |

SM = styrene monomer,
BD butadiene;

General Process for Agglomeration of the Rubber Particles

The rubber particles described in the examples and comparative examples can be agglomerated at a temperature of, for example, 70° C., and care is to be taken here to provide complete mixing of the components during the agglomeration process.

The average particle size $d_{50}$ of the rubber latices from the examples and comparative examples serving as starting material is between 80 to 120 nm, preferably between 90 to 120 nm, its swelling index is 25, and its solids content is approximately 35 to 45%, preferably 38 to 42%.

The agglomeration takes place via continuous addition of the agglomeration latex over a period of 20 to 60 minutes, and the agglomeration latex here is an aqueous dispersion whose solids content is to 15%, preferably 8 to 12%. The amount of agglomeration latex (solid) added to a certain amount of rubber (as solid) is usually termed "phr". This parameter, which is important for the entire process, indicates an amount of agglomeration latex for 100 parts of rubber. By way of example, 1.5 phr means that exactly 1.5 g of solid agglomeration latex is added to 100 g of solid graft base rubber (a1). Once addition of the agglomeration latex has been completed, the mixture described above is stirred for up to 30 minutes. Potassium stearate is then added in the form of aqueous solution.

Process for Preparation of Agglomeration Latex

An initial charge comprising an amount of water, of ethyl acrylate (10% by weight of the entire amount of monomer), and of a surfactant (K30), and the initiator (potassium persulfate, pps) are heated to a temperature of 82° C.

A mixture of ethyl acrylate (remaining amount of 90%), K30, and pps, methylacrylamide (MAM), and water is then introduced for a period of 3 hours. The addition here comprises a mixture of 94.8% by weight of ethyl acrylate and 5.2% by weight of MAM. Once the addition has ended, the mixture is kept at 80° C. for 1 hour. The particle size distribution (measured by means of hydrodynamic fractionation) in the resultant agglomeration latex has approximately d50 equal to 100 nm.

Agglomeration of Rubber Latex with 2.5 phr of Agglomeration Latex

The agglomeration takes place at a temperature of 69° C. with constant mixing of the components during the agglomeration process.

The rubber latex prepared as described in the examples 1, 2, C1 and C2 with an average particle size $D_{50}$ of 100 nm and with swelling index of 25 and solids content of 40% is agglomerated via addition of the agglomeration latex described above within a period of 45 minutes. However, the amount of agglomeration latex added in relation to the rubber (phr) here is 2.5.

Once addition of the agglomeration latex has ended, stirring of the resultant mixture is continued for 15 minutes. Potassium stearate is then added in the form of an aqueous solution. When the coagulated rubber is isolated after agglomeration it is found that a coagulation rate of only 0.1 phr has been achieved.

This means that only 0.1 g of coagulated butadiene was found for 100 g of solid butadiene. The proportion by volume of the agglomerated particles was about 82%, however.

A bimodal particle size distribution (measured by means of hydrodynamic fractionation) is found for the product, with two maxima, a first at about 100 nm and a second at 425 nm.

Agglomeration of the Rubber Particles and General Graft Reaction 4384 g of the rubber latex with 44% of total solid content obtained in examples 1, 2, C1 and C2 in each case are agglomerated as described above at a temperature of 69° C.

After the agglomeration, to each sample 17.8 g of potassium stearate were added. 2.5 g of potassium persulfate, and also water, were then added, the amount of water here being judged in such a way that the solids content of the resultant dispersion after the polymerization reaction has a value of about 40%.

Then to each sample styrene and acrylonitrile (graft monomers (a2)) are added in a ratio of 80:20 and in a total amount of 40% by weight, based on total (a1) and (a2), at a reaction temperature of from 70 to 85° C. over a period of 2 to 4 hours.

Each of the resultant graft copolymer dispersions has bimodal particle size distribution and its average particle size d50 is from 150 to 350 nm, and its d90 particle size is from 400 to 600 nm. Two peak maxima were found in the particle size distribution, the first in the range from 50 nm to 150 nm and the second maximum at from 200 to 600 nm.

0.2% by weight (based on solids content) of a stabilizer is added to each of the resultant copolymer dispersions and the mixture is cooled to 60° C. and coagulated with a 0.5% strength aqueous magnesium sulfate solution. An aging step then takes place at a temperature of 100° C. for 10 minutes. Each of the dispersions is then cooled, centrifuged, and washed with water.

This gives ABS copolymers whose residual moisture level is about 30%.

2. Preparation of Polymers

The thermoplastic polymer B) was prepared by continuous solution polymerization, as described in Kunststoff-Handbuch, ed. R. Vieweg and G. Daumiller, Vol, V "Polystyrol", Carl-Hanser-Verlag, Munich, 1969, p. 122-124.

Polymer B1: SAN polymer containing 25% by weight acrylonitrile b2) and having a viscosity number VN of 60 ml/g.

3. Preparation of the Blends

Blends composed of 68% by weight of thermoplastic polymer B1 and 32% by weight of the graft copolymers according to the examples and comparative examples were prepared.

The graft copolymer A) containing residual water was dried using hot air in vacuo and intimately mixed with component B) in a Werner and Pfleiderer ZSK 30 extruder at 250° C. and 250 rpm (rotation rate per minute), at a throughput of 10 kg/h. The molding composition was extruded and the molten polymer mixture was subjected to rapid cooling by being conducted into a waterbath at 30° C. The hardened molding composition was granulated.

The test data of the obtained ABS polymer blends are shown on Table 2. In the molding compositions graft copolymers A obtained from the rubber dispersions according to examples 1a to 1c and comparative example 2 were used.

TABLE 2

Properties of ABS polymer blends based on inventive and comparative rubber dispersions

| Test items | Comp. Exp. 1 | Comp. Exp 2 | Example 1a | Example 1b | Example 1c | Mean value Example 1a-c |
|---|---|---|---|---|---|---|
| AN/SM/BD by FT-IR, AN % | | 19.3 | 19.6 | 19.6 | 19.3 | 19.6 |
| SM % | | 62.0 | 64.0 | 63.6 | 62.8 | 63.5 |

TABLE 2-continued

Properties of ABS polymer blends based on inventive and comparative rubber dispersions

| Test items | Comp. Exp. 1 | Comp. Exp 2 | Example 1a | Example 1b | Example 1c | Mean value Example 1a-c |
|---|---|---|---|---|---|---|
| BD % | | 18.7 | 16.4 | 16.8 | 17.9 | 17.0 |
| Charpy impact @23° C._notched, kJ/m$^2$ | | 17.3 | 15.6 | 16.3 | 20.4 | 17.6 |
| Charpy impact @−30° C._notched, kJ/m$^2$ | | 8.7 | 8.9 | 8.9 | 9.5 | 9.1 |
| IPT, multiaxial impact strength, J | | 34.8 | 29.9 | 48.3 | 43.5 | 41.0 |
| Tensile strength, kg/cm$^2$ | | 429 | 450 | 442 | 436 | 445.0 |
| Elongation, % | | 39 | 47 | 52 | 27 | 40.5 |
| Flexural strength, kg/cm$^2$ | | 697 | 719 | 700 | 706 | 705.5 |
| Flexural modulus, kg/cm$^2$ | | 23200 | 24600 | 22900 | 22500 | 23200.0 |
| Gloss 20° | | 65.2 | 79.1 | 80.3 | 86.9 | 82.7 |
| Gloss 60° | | 91.4 | 96.2 | 96.3 | 97.8 | 96.8 |
| MVR (220° C./10 kg) ml/10 min | | 18.1 | 23.1 | 23.4 | 21.2 | 22.7 |
| Vicat.S.T(B/50) ° C. | | 98.9 | 99.9 | 99.2 | 97.2 | 98.8 |
| UL 94 Horizontal burning test, mm/min (1.2 mm thickness) | 80-90 | 82.1 | 69.2 | 73.4 | 70.1 | 70.9 |

AN = acrylonitrile, SM = styrene monomer, BD = butadiene,

The examples show the improved burning retardancy of the ABS type polymer. The mechanical properties such as melt flow rate (MVR), impact strength and optical properties such as gloss, transparency are also improved.

The invention claimed is:

1. A process for the preparation of a graft polymer A) having bimodal particle size distribution made from, based on A),
    a1) from 40 to 90% by weight of an elastomeric particulate graft base a1), obtained by polymerization of, based on a1),
        a11) from 75.5 to 89.5% by weight of at least one conjugated diene,
        a12) from 10.5 to 24.5% by weight of at least one vinylaromatic monomer and
    a2) from 10 to 60% by weight of a graft a2) made from, based on a2),
        a21) from 65 to 95% by weight of at least one vinylaromatic monomer,
        a22) from 5 to 35% by weight of acrylonitrile, and
        a23) from 0 to 30% by weight of at least one other monoethylenically unsaturated monomer, the process comprising steps (i), (ii) and (iii):
    (i) emulsion polymerization of monomers a11) and a12) to obtain a graft base a1),
    (ii) partial agglomeration of the graft base a1), and
    (iii) emulsion polymerization of graft monomers a21), a22) and optionally a23) onto the graft base obtained in step (i) or (ii),
    wherein in step (i) the graft base a1) is obtained by emulsion polymerization of an initial seed of from 3 to 8% by weight of vinylaromatic monomer a12),—each based on a1)—followed by addition and statistical copolymerization of the remaining vinylaromatic monomer a12) together with the entire amount of conjugated diene a11).

2. A process according to claim 1, wherein from 5 to 8% by weight of vinylaromatic monomer a12) is used in the initial seed.

3. A graft copolymer A) obtained by the process according to claim 1.

4. A thermoplastic molding composition comprising components A) to G):
    A) from 5 to 80% by weight of a graft polymer A) according to claim 3,
    B) from 20 to 95% by weight of a thermoplastic polymer B) having a viscosity number VN (determined according to DIN 53726 at 25° C., 0.5% by weight in dimethylformamide) of from 50 to 120 ml/g, made from, based on B),
        b1) from 69 to 81% by weight of at least one vinylaromatic monomer,
        b2) from 19 to 31% by weight of acrylonitrile, and
        b3) from 0 to 30% by weight of at least one other monoethylenically unsaturated monomer and
    C) from 0 to 50% by weight of a thermoplastic polymer C) having a viscosity number VN of from 50 to 120 ml/g made from, based on C),
        c1) from 69 to 81% by weight of at least one vinylaromatic monomer,
        c2) from 19 to 31% by weight of acrylonitrile and
        c3) from 0 to 30% by weight of at least one other monoethylenically unsaturated monomer,
    where components B) and C) differ in their viscosity numbers VN by at least 5 units [ml/g], or in their acrylonitrile content by at least 5 units [% by weight], or in both characteristics, viscosity number VN and acrylonitrile content, by at least 5 units and
    D) from 0 to 75% by weight of a thermoplastic polymer D) made from, based on D),
        d1) from 63 to less than 69% by weight of at least one vinylaromatic monomer,
        d2) from more than 31 to 37% by weight of acrylonitrile,
        d3) from 0 to 40% by weight of at least one other monoethylenically unsaturated monomer and
    E) from 0 to 50% by weight of a thermoplastic polymer E) made from, based on E),
        e1) from 4 to 96% by weight of at least one vinylaromatic monomer,
        e2) from 4 to 96% by weight of at least one monomer selected from the group consisting of methyl methacrylate, maleic anhydride and maleimides, and
        e3) from 0 to 50% by weight of acrylonitrile,
    where the polymer E) is different from the polymers B) and from C) and D) if they are present
    F) from 0 to 50% by weight of additives F, and G) from 0 to 75% by weight of polymer G) selected from the group of polycarbonates, polyesters, polyester carbonates and polyamides, and wherein the entire components A) to G) give 100% by weight.

5. A thermoplastic molding composition according to claim 4 wherein based on a1) the vinylaromatic monomer a12) is used in an amount of from 12 to 22% by weight.

6. A thermoplastic molding composition according to claim 4 comprising components A), B) and if present C) to G) in the following amounts, based on the total weight of the molding composition:

A) 10 to 70% by weight,
B) 30 to 90% by weight,
C) 0 to 40% by weight,
D) 0 to 40% by weight,
E) 0 to 40% by weight,
F) 0 to 45% by weight, and
G) 0 to 70% by weight, where the entire components A) to G) give 100% by weight.

7. A thermoplastic molding composition according to claim 4 comprising component G) in an amount of from 0.1 to 75% by weight, based on the total weight of the molding composition.

8. A molding or a shaped article produced from thermoplastic molding composition according to claim 4.

9. A method of producing a molded article, comprising the step of molding composition according to claim 4 to form a molded article selected from the group of a sheet, a semi-finished product, a foil, a fiber, or a foam.

10. A graft copolymer A) according to claim 3, wherein based on a1) the vinylaromatic monomer a12) is used in an amount of from 14 to 21% by weight.

* * * * *